United States Patent [19]

Tani et al.

[11] 4,364,284

[45] Dec. 21, 1982

[54] PARKING BRAKE RELEASING SYSTEM WITH CABLE ATTACHING BUSH

[75] Inventors: Akira Tani, Okazaki; Takeo Yamazaki, Anjo, both of Japan

[73] Assignees: Toyota Jidosha Kogyo Kabushiki Kaisha; Aisin Seiki Kabushiki Kaisha, both of Japan

[21] Appl. No.: 166,905

[22] Filed: Jul. 8, 1980

[30] Foreign Application Priority Data

Sep. 17, 1979 [JP] Japan .......................... 54-129094[U]

[51] Int. Cl.³ .......................... G05G 5/06; F16C 1/10
[52] U.S. Cl. .................................. 74/540; 74/501 R; 403/71; 403/76
[58] Field of Search ................. 74/501 R, 501 P, 512, 74/529, 540, 542; 403/71, 122, 76

[56] References Cited

U.S. PATENT DOCUMENTS

| | | | |
|---|---|---|---|
| 1,772,453 | 8/1930 | Bosworth | 74/501 |
| 1,919,531 | 7/1933 | Rosner | 74/501 |
| 2,899,838 | 8/1959 | Johnstone | 74/540 |
| 2,924,116 | 2/1960 | Abbott | 74/501 |

FOREIGN PATENT DOCUMENTS

| | | | |
|---|---|---|---|
| 26193 | 10/1956 | Fed. Rep. of Germany | 74/501 |
| 598781 | 2/1948 | United Kingdom | 74/501 |

*Primary Examiner*—Kenneth Dorner
*Attorney, Agent, or Firm*—Stevens, Davis, Miller & Mosher

[57] ABSTRACT

A parking brake foot pedal is pivoted to a bracket, and is formed with a ratchet plate portion. A pawl is engaged with the ratchet so as to hold the parking brake in the applied condition. A release lever is pivoted to the bracket so that it displaces the pawl away from the ratchet when it is pulled by a release structure. A resin bush is attached to the release lever at a position remote from its pivoting point. The bush has a hole through it which is narrowest at its middle portion and opens out towards its ends. A release cable passes through this hole in the bush, and on its end there is fixed a stop member larger than the internal diameter of the hole in the bush. Thereby, the end of the release cable is flexibly coupled to the release lever, so as not to be subject to severe bending stress when the release cable is pulled and rotates the release lever so as to displace the pawl away from the ratchet and release the application of the parking brake.

4 Claims, 6 Drawing Figures

PARKING BRAKE RELEASING SYSTEM WITH CABLE ATTACHING BUSH

BACKGROUND OF THE INVENTION

The present invention relates to a releasing mechanism for a foot operated parking brake for an automotive vehicle, and more particularly relates to a releasing system for impelling a release lever assembly of a foot operated parking brake so that it displaces a pawl from engagement with a ratchet formed on the brake pedal.

In more detail, the present invention relates to a coupling mechanism which couples such a release lever assembly to the end of a release cable, so that, when the release cable is pulled, the release lever assembly may be impelled in the direction to displace the pawl from engagement with the ratchet.

In FIGS. 1 and 2 of the accompanying drawings, there are shown in perspective view two prior art constructions for attaching the end of such a release cable to such a release lever assembly.

In FIG. 1, the release lever is designated by 9', and the release cable is designated by 12'. The end of the release lever 9' is bent around into a U-shape, and two opposing openings 26' are pierced in the opposite sides of this U-shape. A slot is cut from the side of one of the openings 26' to the edge of the release lever. On the end of the release cable 12' there is attached a cylindrical pin 18'. The cylindrical pin 18' is engaged into the openings 26', by passing the cable 12' through the aforementioned slot during fitting, and by turning the cable 12' around to its position shown in the drawing, and, thereby, the end of the release cable 12' is coupled to the release lever 9' with rotational movement therebetween being possible around one rotational axis, with one degree of freedom.

In FIG. 2, an alternative prior art construction is shown. In this construction, the release lever 9" is formed with a coupling projection protruding from the side of its end, and a hole 16' is formed through this projection. The release cable 12' passes through this hole 16', and on the end of the release cable 12' there is attached, by soldering or the like, a ball shaped stop member 25'. Therefore, when the release cable 12' is pulled, the ball shaped stop member 25' engages with the edge 17' of the hole 16', so as to couple the release cable 12' to the lower end in the drawing of the release lever 9".

However, both these prior art constructions have their drawbacks.

The prior art construction shown in FIG. 1 has a drawback that the metal-to-metal frictional contact between the cylindrical pin portion 18' and the sides of the holes 26' in the release lever 9' will be relatively rough, and, accordingly, smooth rotation of the release cable 12' with respect to the release lever 9' will not be properly assured. Yet further, this construction has another drawback, in that, in order to fit the release cable 12' to the release lever 9', it is necessary to approach the release cable 12' to the holes 26' in the bent over U-shaped portion of the release lever 9' from a direction approximately 180° opposite to its final position as shown in the drawing, and, because of the restricted space available in a parking brake foot pedal assembly, especially during assembly thereof to the vehicle for which it is intended, this may prove to be very difficult.

The construction shown in FIG. 2 of the accompanying drawings, likewise, has disadvantage that the metal-to-metal contact between the ball shaped stop member 25' and the edge 17' of the hole 16' will not be a smooth contact, and another disadvantage that the release cable 12' interferes with the edge 17', when the cable 12' is inclined much relative to the release lever 9", resulting in bending of the release cable 12' at its portion proximate to the stop member 25'. Over a long service life, such repeated bending to and fro of the end portion of the release cable 12' may well result in premature failure and fracture thereof.

SUMMARY OF THE INVENTION

Accordingly, it is an object of the present invention to provide a construction for connecting the end of a release cable to part of such a release lever remote from its pivoting portion, i.e., to the lower portion as shown in FIGS. 1 and 2 of the accompanying drawings, which provides smoother attachment therebetween than has been the case in the above outlined prior art.

It is a further object of the present invention to provide such a construction for the attaching of the end of such a release cable to such a release lever, which allows a certain desirable amount of rotational movement therebetween with no metal-to-metal contact.

It is a further object of the present invention to provide such a construction for the coupling of the end of such a release cable to such a release lever, which does not result in any substantial to and fro bending of the end part of the release cable, as the release cable is pivoted with respect to the release lever.

It is a further object of the present invention to provide such a connecting construction between the end of such a release cable and such a release lever assembly, which is easier to assemble than the above outlined prior art constructions.

According to the present invention, these and other objects are accomplished by, in a foot operated parking brake, comprising: a pivoted brake pedal formed with a ratchet plate portion and biased in a rotational direction to release braking action; a pivoted pawl, rotatably biased in a direction to engage with the ratched plate portion so as to prevent the brake pedal from moving in said brake releasing direction; and a pivoted release lever assembly formed with an engaging projection, rotational movement of said release lever assembly in a release direction bringing the engaging projection to bear against the pawl so as to impel it in a rotational direction opposite to the direction to engage the ratchet plate portion; a releasing system, comprising: a synthetic resin bush mounted to a part of the release lever assembly remote from the pivoted portion thereof, and formed with a through hole whose middle portion is narrower than its opened out end portions; a release cable, the end of which passes through said through hole in said bush; and a stop member coupled to the end of said release cable which is substantially ball shaped on its side facing one end of said through hole in said bush, and which is larger than said through hole in said bush and prevents the end of the release cable from coming out of said through hole; pulling of the release cable engaging said ball shaped part of said stop member with said bush so as to impel said release lever assembly in said release direction.

According to a particular aspect of the present invention, this bush may be coupled to the release lever by being fitted in a slot formed in a coupling projection formed on the release lever.

According to such a construction, when the release cable is pulled, so as to rotate the release lever, only a certain amount of rotational movement is required between the release cable and the release lever, and this is provided by the ball shaped stop member rotating smoothly and freely upon the opened out end portion of the hole through the bush proximate to the ball shaped stop member. The sliding of the ball shaped stop member upon the end of the bush is greatly facilitated by the fact that the bush is made out of synthetic resin, as opposed to, for example, metal. Further, the opening out of the other end portion of the hole through the bush remote from the ball shaped stop member ensures a sufficient amount of space for the movement of the cable with respect to that end portion, over the limited range of rotational movement between the release cable and the release lever that is in practice required during use of the mechanism. Therefore, by such a construction, undesirable interference between the release cable and the release lever, and also undesirable twisting of the end portion of the release cable itself, are positively and simply prevented.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. In the drawings.

DESCRIPTION OF THE PREFERRED EMBODIMENTS

Figure 1:
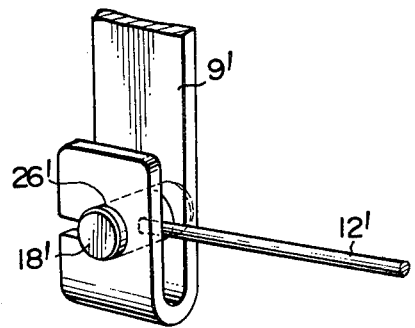
FIG. 1 is a perspective illustration, showing a prior art system for attaching the end of a release cable to a release lever of a parking brake foot pedal assembly, in which a cylindrical pin fixed on the end of the cable is engaged into two opposing holes formed in a U-shaped end portion of the lever.
Figure 2:
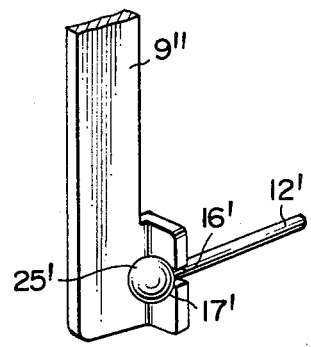
FIG. 2 is a similar figure to FIG. 1, partly cut away, showing another prior art construction for such an attachment of the end of such a release cable to such a release lever, wherein the cable is passed through a hole pierced through a projection extending from the end portion of the lever, and has a ball shaped stop member fitted on it, to prevent it coming back through the hole.
Figure 3:
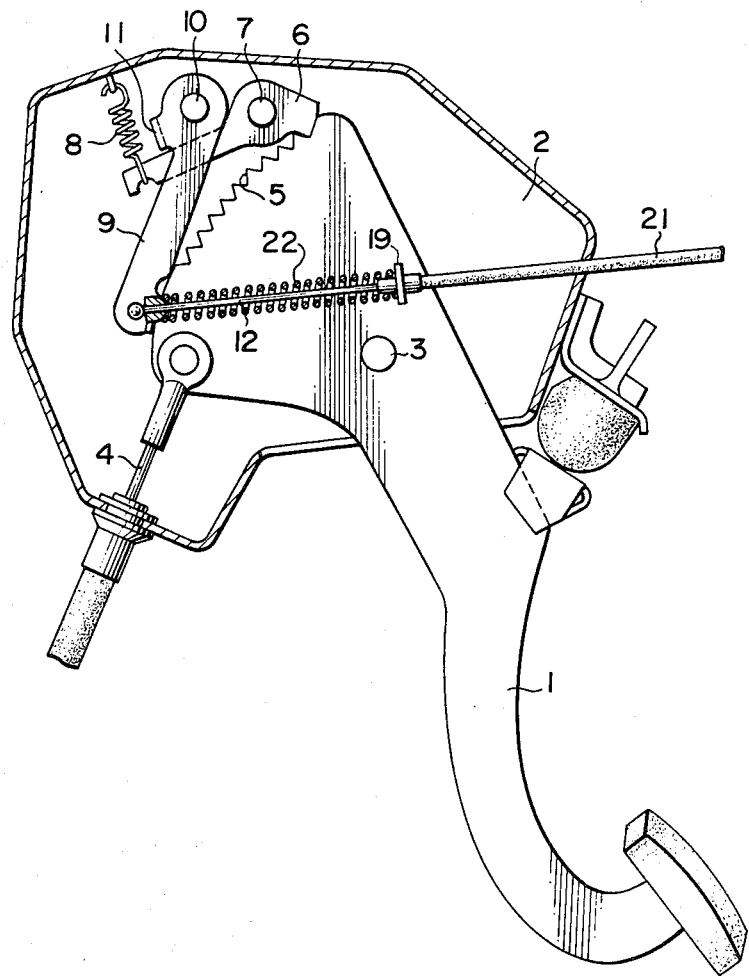
FIG. 3 is an illustrative diagram showing the general construction of a parking brake foot pedal assembly equipped with a releasing system generally according to the present invention.

The present invention will now be described in terms of several preferred embodiments thereof, and with respect to the illustrative drawings. In FIG. 3, which is a general drawing common to both of the preferred embodiments which will be described, the general construction of the parking brake foot pedal assembly and of the releasing system is shown. In the figures, like parts are designated by like reference numerals, and, further, parts which correspond to parts in the two prior art constructions, shown in FIGS. 1 and 2 and already described, are also designated by the same reference numerals as in those figures, but without primes.

The general basic construction of this parking brake assembly is as follows. A brake pedal 1 is pivotally mounted to a pedal bracket 2 by a shaft 3. The pedal bracket 2 is mounted to the vehicle body, which is not shown. To a part of the pedal 1 there is attached one end of a parking brake cable 4, which passes in the downward direction in the drawing and is attached to the parking brake system itself. On an upper portion in the drawing of the pedal 1 there is formed a ratchet plate portion 5 which has teeth formed thereon, and a pawl 6 which engages with this ratchet 5 is pivotally attached to the pedal bracket 2 by a shaft 7. The pawl 6 is biased in the clockwise direction in the figure by the action of a tension coil spring 8 which is mounted between it and a bracket fixed on the pedal bracket 2, so as to engage the pawl 6 with the teeth formed on the ratchet plate portion 5. The shape of the pawl 6, and the shape of the teeth of the ratchet 5, are such that when the foot pad portion of the brake pedal 1 is depressed by the operator of the vehicle so as to rotate the pedal 1 in the clockwise direction in the drawing, the teeth of the ratchet plate 5 click one by one past the pawl 6, each of them slightly rotating this pawl 6 in the counterclockwise direction as it passes it, against the biasing action of the tension coil spring 8; while on the other hand, when the operator of the vehicle releases the pressure of his foot on the foot pad portion of the brake pedal 1 so that the tension in the parking brake cable 4 tends to pull the brake pedal 1 in the counterclockwise direction in the drawing, rotational motion of the brake pedal 1 in this direction is prevented by the pawl 6 locking in against one of the teeth of the ratchet plate 5 and jamming against this tooth.

In this condition, a releasing system is provided for positively biasing the pawl 6 in the counterclockwise direction in the drawing, so as to release the parking brake. This system comprises a release lever 9, the upper end in the drawing of which is pivoted to the pedal bracket 2 about a shaft 10. On the upper portion of the release lever 9 there is formed an engaging projection 11. When the release lever 9 is moved in the anticlockwise direction in the drawing from its position therein shown, this engaging projection 11 bears against a part of the pawl 6 so as positively to bias this pawl 6 in the counterclockwise direction in the drawing and so as to release it from its aforesaid engagement with one of the teeth of the ratchet plate 5, so as to allow the pedal 1 to move in the counterclockwise direction in the drawing and release the action of the parking brake.

The lower end of the release lever 9 is attached to the left hand end in the drawing of an inner release cable 12 by a construction which will be more fully described later. The inner release cable 12 extends to the right in the drawing, and passes into an outer cable 21. The combination of the inner release cable 12 and the outer cable 21 is extended upwards to a knob or some similar gripping means, not shown, which is adapted to be gripped by the hand of the driver so as, by pulling, to impel the release lever 9 counterclockwise in the drawing.

The lower portion of the release cable 12 extends generally alongside and parallel to the ratchet plate portion 5, and passes through the central hole of a return compression coil spring 22. The left hand end of this compression coil spring 22 impels the lower end in the drawing of the release lever 9 in the left hand direction, either by directly pressing against it, or by pressing against a bush mounted on it, as will be hereinafter explained; and the right hand end in the drawing of the compression coil spring 22 bears, either directly or indirectly, against the outer cable 21, or against a bracket connected to the body of the vehicle.

Thereby, the compression coil spring 22 opposes pulling on the release cable 12 by the operator of the vehicle, and biases the release lever 9 in the clockwise direction in the drawing. The provision of this return compression coil spring 22 as lying around the end portion of the release cable 12 which extends generally alongside and parallel to the ratchet plate portion 5, ensures that the construction of the parking brake foot pedal assembly is compact, because this return compression coil spring 22 is located in a position which, in the prior art, was unused or dead space. This inventive concept is explained more fully, and is claimed, in copending U.S. patent application Ser. No. 166,904, filed on the same day as the present application by the same applicants as, and assigned to the same assignees, as the present application.

Figure 4:
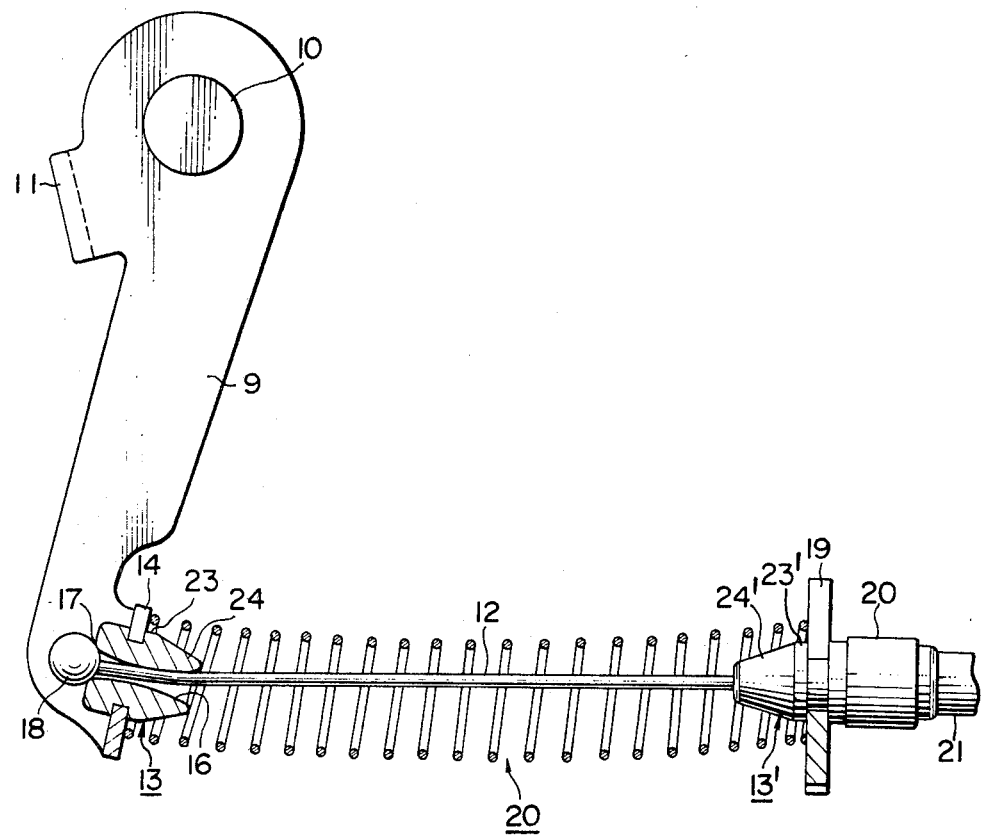
FIG. 4 is an enlarged view of a releasing system according to a first preferred embodiment of the present invention, and as generally shown in FIG. 3.
Figure 5:
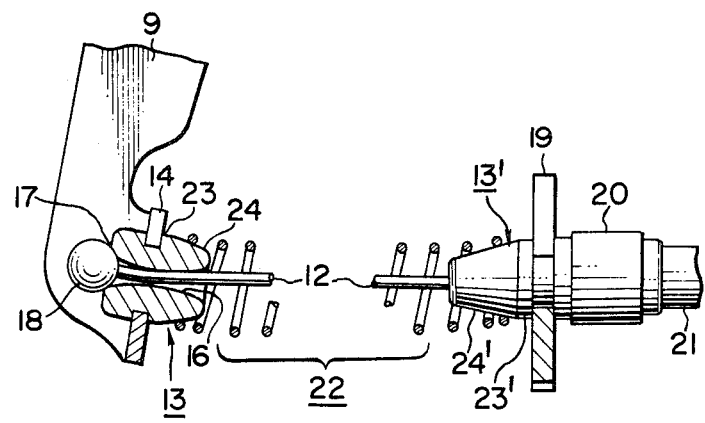
FIG. 5 is a view of the most important parts of a releasing system which is a second preferred embodiment of the present invention, shown in a fashion similar to a part of FIG. 4.

FIGS. 4 and 5 show in more detail the more precise structures of a first and a second preferred embodiment of the releasing system according to the present invention, to both of which embodiments FIG. 3 is applicable.

Figure 6:
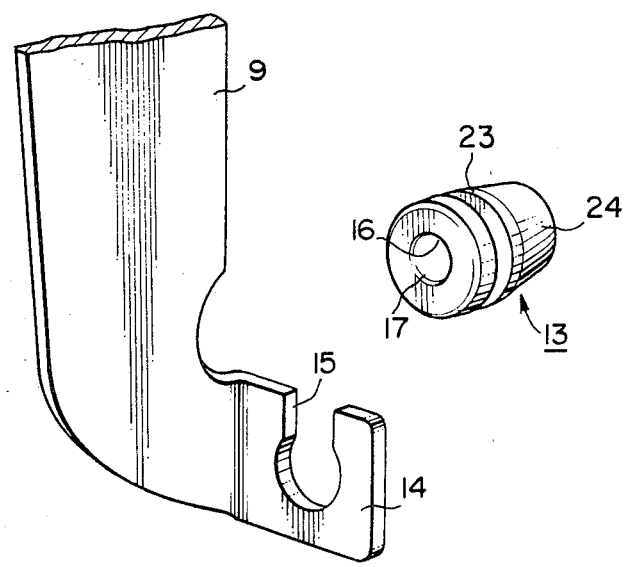
FIG. 6 is a perspective view of part of a release lever, of a coupling projection formed on this release lever, and of a bush formed with a constricted portion for engaging into a slot in this engaging projection, which are essential parts of both of the first and the second embodiments shown in FIGS. 4 and 5.

In FIG. 4, which shows the first preferred embodiment, the left hand end in the drawing of the release cable 12 is passed through the central hole of a bush 13 which is made of synthetic resin. On the end of the release cable 12 there is fixed, by welding or the like, a ball shaped stop member 18, which is larger than the central hole in the bush 13. The bush 13 is formed with a constricted portion in the middle of its outer surface, and this constricted portion is engaged with the sides of a slot 15 which is formed in a coupling projection 14 which projects from the release lever 9. The hole through the center of the bush 13 is narrower towards its middle portion, and opens out towards its ends, as may be seen in section in FIG. 4. The bush 13, and the lower end of the release lever 9 including the coupling projection 14 with the slot 15 formed therein, may be seen in a perspective view in FIG. 6. The purpose of such a structure is that a limited amount of angular movement is permitted between the inner release cable 12 and the release lever 9, without undue friction or rubbing therebetween, and without bending being caused in the release cable 12. This is because the ball shaped stop member 18 turns smoothly on the relatively smooth surface of the end of the synthetic resin bush 13, the widened out end portions of the central hole in the bush 13 serving to allow a certain amount of sideways movement of the release cable 12 with respect to these end portions.

The left hand end in the drawing of the outer cable 21 is attached to a bush 13', which again is formed of a synthetic resin material, by a clip 20. The bush 13' is formed with a constricted portion around its middle which engages within a slot formed in a mounting projection 19 which is attached to the body of the vehicle, or which alternatively is attached to the pedal bracket 2. The return compression coil spring 22, as stated above, is fitted around the exposed portion of the release cable 12, which extends generally alongside and parallel to the ratchet plate portion 5, and the left hand end of the compression coil spring 22, in the first embodiment shown in FIG. 4, bears directly against the coupling projection 14 formed on the release lever 9, and snugly surrounds and is located by the base peripheral outer surface 23 of the right hand end of the bush 13. Similarly, the right hand end in the drawing of the compression coil spring 22 fits snugly around and is located by the base peripheral outer surface 2340 of the left hand end of the bush 13', and bears directly against the coupling projection 19. Thereby, the return compression coil spring 22 positively and effectively biases the release lever 9 in the clockwise direction in the drawing, and, because of its positioning around the exposed portion of the release cable 12, is conveniently located.

In the second embodiment of the releasing system according to the present invention shown in FIG. 5, the constructions of the bush 13, the coupling projection 14, etc., are the same, as were the constructions of the bush 13 and the coupling projection 14 in the first embodiment shown in FIG. 4. However, in this second embodiment, the internal diameter of the compression coil spring 22 is a little smaller relative to the bush 13, so that its left hand end fits snugly over a conical end outer surface 24 of the right hand side of the bush 13, and does not directly press upon the coupling projection 14. Further, the right hand end in the drawing of the compression coil spring 22 does not bear directly upon the coupling projection 19, but on the contrary, because of its reduced relative diameter as compared with the diameter of the compression coil spring 22 of the first embodiment shown in FIG. 4, fits snugly around a conical end outer surface 24' of the bush 13'.

The biasing action of the return compression coil spring 22 in this embodiment, of course, when the mechanism has been assembled, is substantially identical in function to that of the return spring 22 of the first embodiment. Further, the function of the synthetic resin bush 13 and the ball shaped stop member 18, for coupling the release cable 12 to the lower end in the figure of the release lever 9, is substantially identical in function to that in the first embodiment. However, it will be clear to one skilled in the art, based upon the above disclosure, that the process of assembly for this second embodiment will be much simpler and easier than that of the first embodiment, because in the first embodiment the compression coil spring 22 is a substantially separate member from the assembly comprising the inner cable 12 and the outer cable 21, and must be fitted over the exposed portion of the inner cable 12 after the outer cable 21 has been fitted to the coupling projection 19, and before the bush 13 has been fitted into the coupling projection 14, and this may well be difficult, due to space restrictions; while on the other hand, in the second embodiment shown in FIG. 5, because the compression coil spring 22 is necessarily mounted onto the assembly comprising the inner cable 12, the outer cable 21, and the bush 13, before this assembly is fitted to the parking brake foot pedal mechanism as a whole, and is automatically retained thereon by the conical end outer surfaces 24 and 24' of the bushes 13 and 13', therefore, the assembly of the cable assembly to the parking brake foot pedal mechanism in this second embodiment of the present invention will be much facilitated, and will be much less finicky and troublesome.

In the second embodiment, as in the first embodiment, the location of the return compression coil spring 22 as surrounding the exposed portion of the inner release cable 12 ensures that the construction of the parking brake foot pedal assembly is compact and convenient.

The operation of the parking brake foot assembly shown in FIG. 3, according to either of the embodiments shown in FIGS. 4 and 5, is as follows. When the foot pad portion of the parking brake pedal 1 is stepped on by the driver of the vehicle, the pedal 1 rotates in the clockwise direction in the drawing, and the pawl 6 slips freely over and clicks past the teeth of the ratchet plate 5. Thus, the parking brake cable 4 is pulled, operating the parking brake of the vehicle. When the driver releases his foot from the foot pad portion of the parking brake pedal 1, the pedal 1 is prevented from rotating in the anticlockwise direction so as to release the application of the parking brake, because the pawl 6 positively engages against one of the teeth formed on the ratchet plate portion 5 and jams against it, thus immobilizing the pedal.

When it is desired to release the engagement of the parking brake, the operator of the vehicle pulls upon the knob (not shown) at the remote end from the foot pedal assembly of the inner cable 12, and accordingly the inner cable 12 is pulled so as, by the coupling between the inner cable 12 and the release lever 9 performed by the stop member 18 and the bush 13, to pull the lower end of the release lever 9 and so as to rotate the release lever 9 in the counterclockwise direction in the drawing against the compression force of the compression coil spring 22, and accordingly the engaging projection 11 pushes against the pawl 6 so as to rotate this pawl 6 in the counterclockwise direction in the drawing against the tension force of the tension coil spring 8, and thereby the pawl 6 is released from its engagement with the ratchet plate 5. Accordingly, the tension in the parking brake cable 4, aided by the action of a return spring (not shown) or by the weight of the parking brake pedal 1, returns the pedal 1 to its original or non-parking-brake-applied position.

During the abovementioned operation, when the return compression coil spring 21 is compressed about the projecting portion of the release cable 12, it will probably not be compressed in a straight line, but will be formed into undulations or waves. However, this tendency will be controlled by the fact that the inner parts of the compression coil spring 22 are positively positioned by, in the first embodiment, the base peripheral outer surfaces 23 and 23', and, in the second embodiment, the conical end outer surfaces 24 and 24', of the bushes 13 and 13', respectively. This locating and controlling action will be more pronounced in the second embodiment shown in FIG. 5, because in this embodiment as a matter of course the inner diameter of the return compression coil spring 22 is relatively smaller. Further, by the provision of the synthetic resin bush 13, and by the shape of the central hole therethrough, undesirable twisting of the end portion of the cable 12 will be prevented, and thereby early fatigue and breakage of the release cable 12 will be prevented.

As described above, because the return spring for the release lever 9 is disposed as surrounding the exposed portion of the relese cable 22, which extends generally alongside and parallel to the ratchet plate portion 5, this construction advantageously utilizes the limited space available within the parking brake foot pedal assembly, and accordingly provides a more compact and practical structure, which is easier to assemble.

Further, as described above, the smooth turning of the ball shaped part of the stop member 18 against the end surface 17 of the hole through the bush 13, with no metal-metal contact therebetween, will ensure that the operation of releasing the parking brake is performed smoothly and reliably, even after a long period of service of the mechanism. Further, because of the provision of the bush 13, it is ensured that the release cable 12 will not interfere with the coupling projection 14 on the release lever 9. Yet further, because of the fact that the hole 16 through the bush 13 is narrower at its central portion, and is opened out towards its ends portions, i.e., is formed in a so-called trumpet shape, it is ensured that sharp twisting of the end portion of the release cable 12 is positively prevented. Thereby, breaking of the release cable 12 due to repeated bending of its end portion to and fro is assuredly prevented, even over a long period of service operation.

In other embodiments, the coupling between the bush 13 and the lower part in the drawings of the release lever 9 could be performed in a different way, other than by a constricted part of the bush 13 being engaged into the slot formed in the coupling portion 14, as was the case in the shown embodiments. Although the present invention has been shown and described in terms of two preferred embodiments thereof, and in language more or less specific with regard to structural features thereof, and with reference to the illustrative drawings, it should be understood that in any particular embodiment of the present invention various changes, modifications, and omissions of the form and the detail thereof could be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

We claim:

1. In a foot operated parking brake, comprising:
  a pivoted brake pedal formed with a ratchet plate portion and biased in a rotational direction to release braking action;
  a pivoted pawl, rotatably biased in a direction to engage with the ratchet plate portion so as to prevent the brake pedal from moving in said brake releasing direction;
  and a pivoted release lever assembly formed with an engaging projection, rotational movement of said release lever assembly in a release direction bringing the engaging projection to bear against the pawl so as to impel it in a rotational direction opposite to said direction to engage the ratchet plate portion said release lever assembly having a slot located at a position remote from the pivoted thereof;
  a releasing system, comprising:

a synthetic resin bush having a constriction in its outer surface and mounted to said slotted part of the release lever assembly with said constriction engaged in said slot, said bush also having a through hole whose middle portion is narrower than its opened outwardly facing end portions with tapered trumpet shaped walls;

a release cable, one end of which passes through said through hole in said bush;

and a stop member coupled to the end of said release cable which is substantially ball shaped on its side facing one end of said through hole in said bush, and which is larger than said through hole in said bush thus preventing the end of the release cable form coming out of said through hole;

the arrangement being such that pulling of the release cable engages said ball shaped part of said stop member with said bush so as to impel said release lever assembly in said release direction.

2. A releasing system according to claim 1, further comprising a compression coil spring which biases said release lever assembly in a direction opposite to said release direction, one end of said spring being passed around said bush so as to bear against said slotted part of said release lever assembly.

3. A releasing system according to claim 1, further comprising a compression coil spring which biases said release lever assembly in a direction opposite to said release direction, wherein said bush has a conically convergent outer end surface facing one end of said spring, and said one end of said spring is engaged at a middle portion of said conically convergent outer end surface of said bush.

4. A releasing system according to claim 1, wherein said constriction in said bush is an annular constriction, and said slot includes an arcuate part which snugly receives said annular constriction and a constricted part extending between said arcuate part and an inlet end of said slot.

* * * * *